United States Patent [19]

Tibbs

[11] 4,077,479
[45] Mar. 7, 1978

[54] CULTIVATOR PLOW SWEEPS WITH EXTENDED VERTICAL VANES CONNECTED BY BRACE

[76] Inventor: Robert C. Tibbs, Hospital Dr., Cleveland, Miss. 38732

[21] Appl. No.: 698,199

[22] Filed: Jun. 21, 1976

[51] Int. Cl.² ............................................. A01B 39/26
[52] U.S. Cl. .................................... 172/730; 172/509
[58] Field of Search ................... 172/19, 20, 509, 513, 172/698, 722, 723, 724, 730, 733, 381; D8/7, 9, 11, 13

[56] References Cited
U.S. PATENT DOCUMENTS

| | | | |
|---|---|---|---|
| 31,977 | 4/1861 | Howard | 172/381 |
| 278,372 | 5/1883 | Stearns | 172/733 X |
| 568,143 | 9/1896 | Parcells | 172/509 X |
| 709,147 | 9/1902 | Fay | 172/730 |
| 1,017,942 | 2/1912 | Wright | 172/730 |
| 1,381,028 | 6/1921 | Stevenson | 172/724 |
| 1,739,489 | 12/1929 | Wagner | 172/381 |

*Primary Examiner*—Richard T. Stouffer
*Attorney, Agent, or Firm*—Clarence A. O'Brien; Harvey B. Jacobson

[57] ABSTRACT

A cultivator including a plow in which a pair of sweeps extend outwardly and downwardly from a plow shank for pushing soil outward from the center of the plow has at least one of the sweeps provided with a vertical vane at an outer end portion thereof for preventing any weed seeded soil from being placed on a herbicide banded area adjacent the path of the cultivator. Where each sweep is provided with a vertical vane, a rigidifying brace may be provided extending between the vanes.

2 Claims, 9 Drawing Figures

CULTIVATOR PLOW SWEEPS WITH EXTENDED VERTICAL VANES CONNECTED BY BRACE

BACKGROUND OF THE INVENTION

1. Field of the Invention

This invention relates generally to cultivating, and particularly to the retention of the potency of a herbicide banded area while cultivating row crops.

2. Description of the Prior Art

Conventional cultivator sweeps push soil outward from the center of the plow of the cultivator. This outward expulsion of soil covers a herbicide banded area on which the row crops are planted, with the soil thus covering containing numerous moxious weed seeds which results in weeds being planted in the banded area. The forward-angle plow usually used with the conventional cultivators may tend to push one-quarter of an inch to one-half of an inch of unbanded soil onto the band, with the flow of the soil being stopped only by the vertical ridges formed in conjunction with the growing of row crops.

It is known generally to provide a fender on one side of a conventional plow employing a shovel-like blade. See, for example, U.S. Pat. Nos. 214,825, issued Apr. 29, 1879 to F. B. Kendall; 376,393, issued Jan. 10, 1888 to H. S. Null et al.; and 415,887, issued Nov. 26, 1889 to W. H. Trammel. Further, U.S. Pat. No. 568,143, issued Sept. 22, 1896 to H. A. Parcells, discloses a shuffle hoe having wings provided on either side of a horizontal blade.

SUMMARY OF THE INVENTION

It is an object of the present invention to provide an improved cultivator capable of retaining the potency of the herbicide band while cultivating row crops.

It is another object of the present invention to provide a cultivator capable of preventing any weed seeded soil from being placed on the herbicide banded area during cultivation of row crops.

It is yet another object of the present invention to provide a cultivator including a forward-angle plow which will prevent loosened soil from being spilled onto the banded herbicide area associated with the crops.

These and other objects are achieved by providing a cultivator including a plow comprising a pair of sweeps arranged joined at a center of the plow and extending outwardly and downwardly toward the soil being plowed from the center of the plow, each toward an outer end for pushing soil outward from the center of the plow, with a vane being disposed on the outer end of one of the sweeps for preventing any weed seeded soil from being placed on a herbicide banded area adjacent the path of the cultivator.

According to a preferred embodiment of the invention, the vane is a planar element disposed in a plane substantially perpendicular to the extent of the associated sweep so as to be disposed vertically relative to the soil being plowed and extending in the normal direction of movement of the plow.

Advantageously, each of the sweeps of the plow is provided with a vane, with each of the vanes being substantially like the other.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
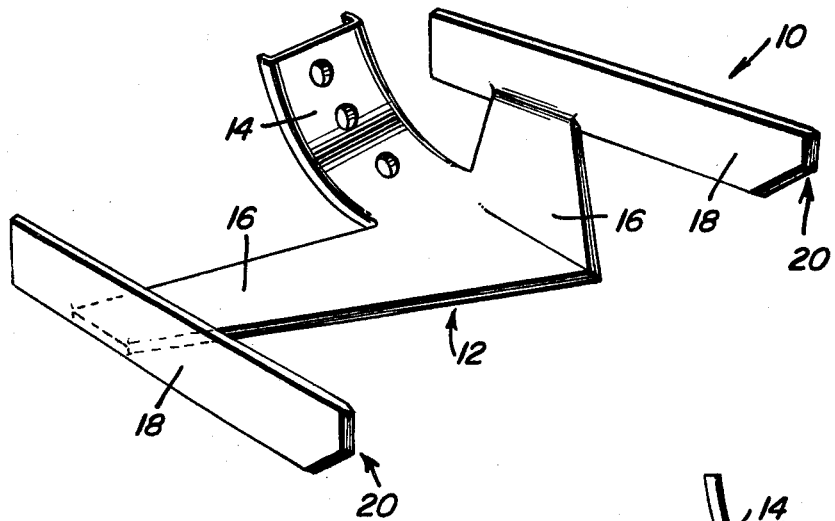
FIG. 1 is a perspective view showing a first embodiment of a cultivator according to the present invention.

Referring now more particularly to FIG. 1 of the drawings, a cultivator 10 according to the present invention includes a conventional cultivator plow 12 having a shank 14 merging into a pair of diverging sweeps 16 joined at a center of the plow and extending outwardly and downwardly from one another toward outer end portions. These sweeps 16 are disposed for pushing soil (not shown) outward from the longitudinal centerline of the plow in order to cultivate a path along which the cultivator is moved. Disposed on the outer end portions of sweeps 16 are respective vanes 18 for preventing any weed seeded soil, and the like, displaced by sweeps 16 from being placed on a herbicide banded area (not shown) which is conventionally arranged adjacent the path of a cultivator in row crop cultivation. Each of the vanes 18 is provided with a pointed tip 20 which facilitates passage of the respective vane 18 through the soil being plowed.

Figure 2:
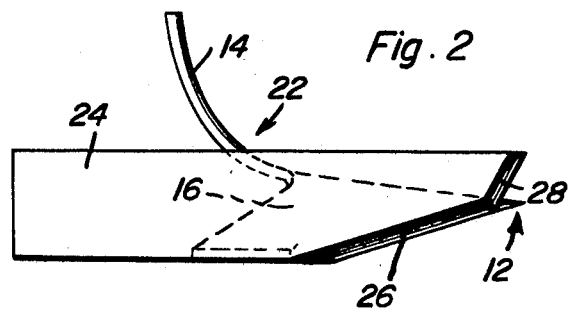
FIG. 2 is a side elevational view showing an embodiment of the invention similar to the embodiment shown in FIG. 1, but having modified vanes on the sweeps.

FIG. 2 discloses a cultivator 22 according to the invention which is similar to cultivator 10 of FIG. 1, but is provided with vanes 24, only one of which is shown, of slightly different configuration than vanes 18 inasmuch as vanes 24 are provided with a forwardly directed slant edge 26 which merges into a front edge 28 of greater angle relative to the longitudinal extent of the respective vane 24.

Figure 3:
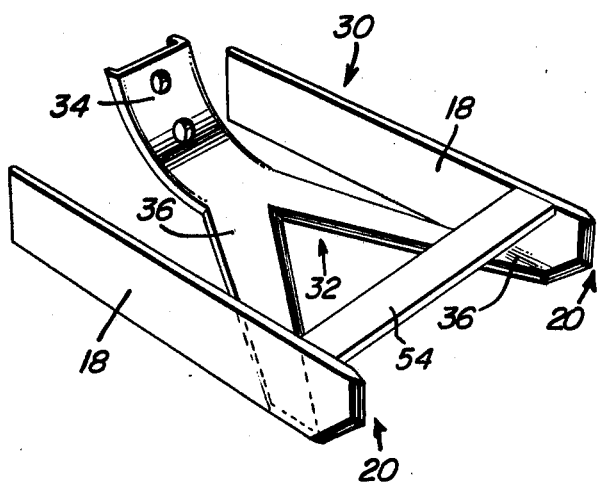
FIG. 3 is a perspective view showing a third embodiment of the present invention provided with a brace for rigidifying the vanes.

Referring now to FIG. 3 of the drawings, a cultivator 30 includes a forward-angle plow 32 having an upwardly turned shank 34 merging forwardly and downwardly with a pair of diverging sweeps 36 disposed extending downwardly away from shank 34 at an acute angle with respect to one another for forming a Y in cooperation with shank 34. A brace 54 rigidifies the vanes 18.

While the cultivator 30 is shown in FIG. 3 as provided with vanes 18 such as used on cultivator 10, FIG.

Figure 4:
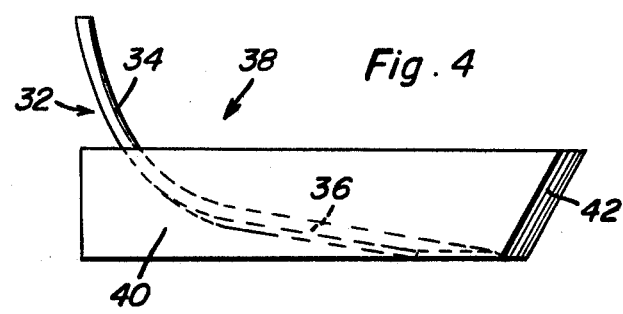
FIG. 4 is a side elevational view showing an embodiment of the present invention similar to the embodiment shown in FIG. 3, but having vanes of different configuration and no rigidifying brace.

4 shows a cultivator 38 including a plow 32 but provided with vanes 40 which are provided with a front edge 42 which is at only a slight angle with respect to a plane at right angles to the longitudinal extent of each of the vanes 40. As in FIG. 2, only one of the vanes 40 is shown in FIG. 4.

Figure 5A:
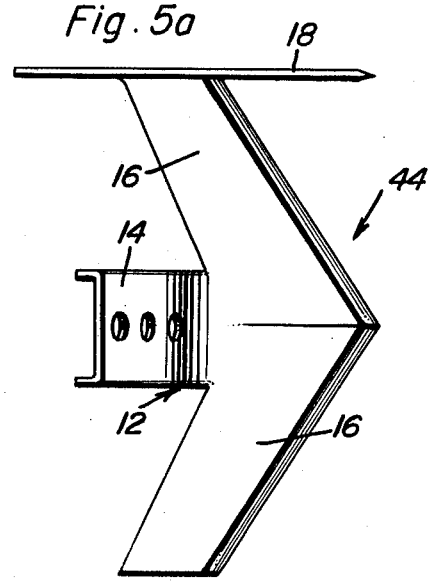
FIGS. 5a and 5b are top plan views showing embodiments of the invention similar to the embodiment of FIG. 1, but having only one vane each, with the vane being mounted on either of the sweeps.
Figure 5B:
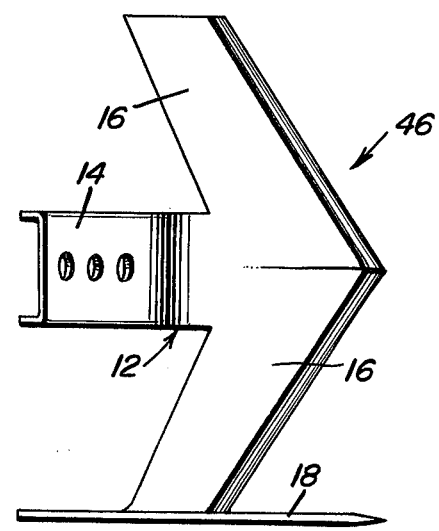
Figure 6A:
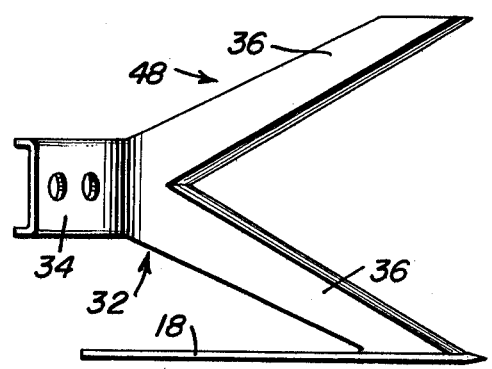
FIGS. 6a and 6b are top plan views showing embodiments of the invention similar to the embodiment of FIG. 3, but having only one sweep provided with a vane, with the vane being provided on either of the sweeps.
Figure 6B:
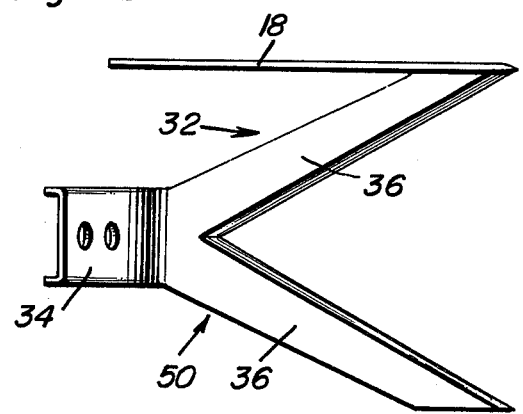

Proceeding to the second sheet of the drawings, FIGS. 5a and 5b show cultivators 44 and 46, respectively, wherein plows 12 are provided with only one vane 18. As can be seen from these figures, the vane can be on only the left side or the right side sweep 16 looking in the direction of plowing movement of plow 12. The direction of plowing movement is to the right as seen in FIGS. 5a and 5b. FIGS. 6a and 6b are similar to FIGS. 5a and 5b, except that they show cultivators 48 and 50 wherein plow 32 of FIGS. 3 and 4 is provided with only a single vane 18. More specifically, a vane 18 is provided on the right sweep 36 in FIG. 6a, and on the left sweep 36 in FIG. 6b. The use of the cultivators 44, 46, 48, and 50 is indicated when it is necessary to prevent the soil being cultivated from being thrown into a herbicidal band area present on only one side of the associated cultivator.

Figure 7:
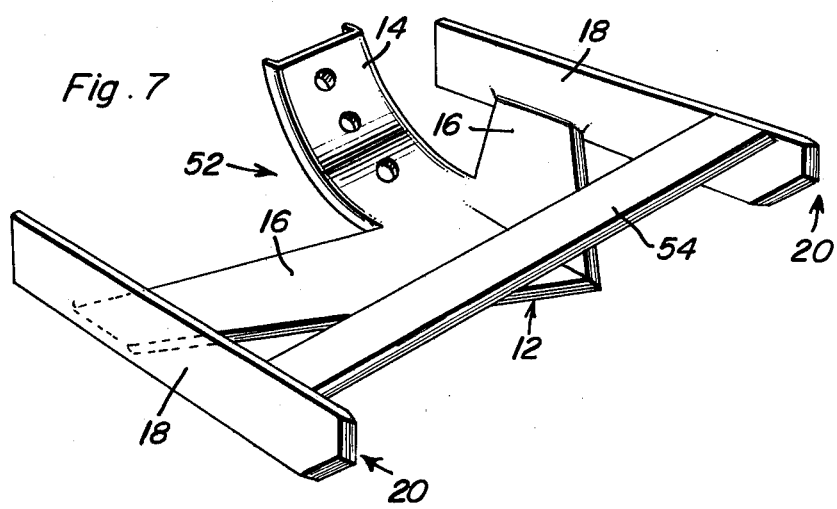
FIG. 7 is a perspective view showing yet another embodiment of the invention similar to the embodiment of FIG. 1, but provided with a brace for rigidifying the vanes.

A cultivator 52 is shown in FIG. 7 wherein a conventional cultivator sweep plow 12 is shown as provided with a pair of vanes 18 rigidified as by the brace 54 extending between the vanes 18 just rearward of the pointed tips 20 thereof. In this manner, the vanes 18 will be greatly strengthened when being used in hard ground, and the like.

As can be readily understood from the above description and from the drawings, a cultivator according to the present invention totally prevents any weed seeded soil from being placed on a herbicide banded area by use of a simple yet rugged construction which does not interfere with the basic plowing operation of the cultivator.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In a cultivator including a plow comprising a pair of sweeps arranged joined at a center of the plow and disposed extending outwardly and downwardly from one another, each toward an outer end, and forming means for pushing soil outward from the center of the plow, the improvement comprising vane means disposed on the outer end of one of the sweeps for preventing weed seeded soil from being placed on a herbicide banded area adjacent a path of movement of the cultivator, the vane means including a planar element disposed substantially perpendicularly to the extent of the associated sweep and provided with a pointed end extending in a direction parallel to the normal direction of movement of the plow along the path of movement of the cultivator, each of the sweeps being provided with vane means, with each of the vane means being like the other, a brace being connected between the pair of vane means for rigidifying the vane means, the vane means being mounted on a plow including an upturned shank and a pair of sweeps disposed extending away from the shank and at an acute angle with respect to one another for forming a Y in cooperation with the shank.

2. In a cultivator including a plow comprising a pair of sweeps arranged joined at a center of the plow and disposed extending outwardly and downwardly from one another, each toward an outer end, and forming means for pushing soil outward from the center of the plow, the improvement comprising vane means disposed on the outer end of one of the sweeps for preventing weed seeded soil from being placed on a herbicide banded area adjacent a path of movement of the cultivator, the vane means including a planar element disposed substantially perpendicularly to the extent of the associated sweep and provided with a pointed end extending in a direction parallel to the normal direction of movement of the plow along the path of movement of the cultivator, the vane means being mounted on a plow including an upturned shank and a pair of sweeps disposed extending away from the shank and at an acute angle with respect to one another for forming a Y in cooperation with the shank, each of the sweeps being provided with vane means, with each of the vane means being like the other, a brace being connected between the pair of vane means for rigidifying the vane means said brace being positioned adjacent the pointed ends of the vane means.

* * * * *